United States Patent
von Blücher et al.

(10) Patent No.: US 7,160,369 B2
(45) Date of Patent: Jan. 9, 2007

(54) ADSORPTION FILTER MATERIAL WITH HIGH ADSORPTION CAPACITY AND LOW BREAKTHROUGH BEHAVIOR

(75) Inventors: Hasso von Blücher, Erkrath (DE); Ludovic Ouvry, Düsseldorf (DE); Stefan Kämper, Ratingen (DE); Michael Moskopp, Schwalmtal (DE); Ernest de Ruiter, Leverkusen (DE); Bertram Böhringer, Wuppertal (DE)

(73) Assignee: Blücher GmbH, Erkrath (DE)

( * ) Notice: Subject to any disclaimer, the term of this patent is extended or adjusted under 35 U.S.C. 154(b) by 290 days.

(21) Appl. No.: 10/825,745

(22) Filed: Apr. 16, 2004

(65) Prior Publication Data
US 2004/0237790 A1     Dec. 2, 2004

(30) Foreign Application Priority Data
Apr. 17, 2003  (DE)  ................. 103 18 053

(51) Int. Cl.
*B01J 20/20*   (2006.01)
*B01D 39/20*   (2006.01)

(52) U.S. Cl. .................... 96/132; 96/135; 96/153; 96/154; 55/DIG. 33

(58) Field of Classification Search .......... 95/90, 95/273, 285; 96/4, 11, 121, 131, 132, 134, 96/135, 153, 154; 55/315, 318, 527, DIG. 33
See application file for complete search history.

(56) References Cited

U.S. PATENT DOCUMENTS

| | | | | |
|---|---|---|---|---|
| 3,944,403 A | * | 3/1976 | Simpson et al. | 96/131 |
| 4,565,727 A | * | 1/1986 | Giglia et al. | 428/172 |
| 4,904,343 A |   | 2/1990 | Giglia et al. | |
| 5,486,410 A | * | 1/1996 | Groeger et al. | 442/353 |
| 5,605,746 A |   | 2/1997 | Groeger et al. | |
| 5,731,065 A |   | 3/1998 | Stelzmüller et al. | |
| 2001/0035094 A1 | * | 11/2001 | Takagaki et al. | 96/154 |
| 2002/0046656 A1 | * | 4/2002 | Benson et al. | 95/287 |
| 2002/0129711 A1 | * | 9/2002 | Oda et al. | 96/134 |
| 2003/0089237 A1 | * | 5/2003 | Jagtoyen et al. | 96/108 |

FOREIGN PATENT DOCUMENTS

| | | | |
|---|---|---|---|
| DE | 43 10 110 | | 1/1994 |
| JP | 2003-102818 A | * | 4/2003 |

* cited by examiner

*Primary Examiner*—Frank M. Lawrence
(74) *Attorney, Agent, or Firm*—Cohen, Pontani, Lieberman & Pavane

(57) ABSTRACT

An adsorption filter material used especially for producing protective materials, such as NBC protective suits, has a first layer, a second layer, and an adsorption layer arranged between the first layer and the second layer. The adsorption layer has a first activated carbon layer with granular or spherical activated carbon particles. The first activated carbon layer additionally contains activated carbon fibers and/ or the adsorption layer additionally contains a second activated carbon layer with activated carbon fibers.

38 Claims, 1 Drawing Sheet

ADSORPTION FILTER MATERIAL WITH HIGH ADSORPTION CAPACITY AND LOW BREAKTHROUGH BEHAVIOR

BACKGROUND OF THE INVENTION

1. Field of the Invention

The present invention relates to an adsorption filter material or flat-shaped filter material which is suitable especially for the production of protective materials, such as protective suits, especially NBC protective suits, protective gloves, protective covers, as well as for other filtering applications (e.g., for air filters or medical applications). The present invention also relates to the use or application of the inventive adsorption filter material or flat-shaped filter material.

2. Description of the Related Art

There is a series of substances that are absorbed by the skin and result in severe physical damage. Examples of such substances include chemical warfare agents, such as mustard gas (yellow cross), which is a vesicant, and sarin, which is a nerve gas. Individuals who may come into contact with these toxic agents must wear a suitable protective suit or be protected against these toxic agents by suitable protective materials.

There are basically three types of protective suits: Protective suits that are impermeable to air and water vapor which are furnished with a layer of rubber that is impermeable to toxic chemical agents and cause the wearer to experience a very rapid buildup of heat; protective suits that are furnished with a membrane that allows the passage of water vapor but not the passage of the specified toxic agents; and, finally, permeable protective suits which are permeable to air and water vapor and afford the highest measure of wearing comfort.

Air-permeable materials are preferred for use in protective suits against chemical warfare agents because these suits are intended for extended use under a wide variety of conditions and must not cause heat buildup in the wearer.

Protective suits that are permeable to air generally have an adsorption layer based on activated carbon which can very stably bind or adsorb harmful or toxic chemical agents (e.g., chemical warfare agents), so that even strongly contaminated suits pose no danger whatsoever to the wearer. The adsorption layer is generally fixed on or applied to a textile substrate, especially an air-permeable substrate.

In this regard, various embodiments of the activated carbon-containing adsorption layer are known from the state of the art which generally involve a sandwich or composite construction that consists of a textile support layer, an adsorption layer joined to it, and an outer or cover layer applied over the adsorption layer.

One possibility is to use powdered activated carbon as the adsorbent which, together with a polymer binder, is printed on the textile substrate as a dispersion (see, e.g., U.S. Pat. No. 4,455,187). In this case, however, the powdered activated carbon is completely embedded in the binder and is thus completely surrounded by it. Therefore, the surface of the activated carbon is not freely accessible to the toxic substances that are to be adsorbed and the toxic substances must first migrate or diffuse through the binder to the activated carbon where they are finally adsorbed. This is not very efficient. Moreover, powdered activated carbon has only a relatively low adsorption or loading capacity for harmful and toxic substances to be adsorbed.

It is also well known that granular or spherical particles of activated carbon with mean diameters of up to about 1 mm may be used as adsorbents in protective suits of this kind instead of powdered activated carbon (see, e.g., U.S. Pat. No. 4,510,193). In this case, the adsorption layer of the activated carbon granules or spherical particles is usually formed such that the activated carbon particles are bound on spots of adhesive printed on a textile substrate. Furthermore, the adsorption layer is generally completed by an "outer material" (i.e., a cover material) and may be covered on the inner side that faces the textile substrate by a light, likewise textile material. However, although granular or spherical activated carbon particles have a relatively high total adsorption or loading capacity, the adsorption rate or adsorption kinetics is not always adequate, such that breakthroughs can occur. To avoid breakthroughs, larger amounts of activated carbon particles may be applied, but this results in overdimensioning of the total adsorption or loading capacity that is being made available with respect to the filter material or the protective suit. Furthermore, under extreme conditions, for example, if a drop of a concentrated toxic agent falls from a considerable height onto an open place in the outer material and penetrates as far as the activated carbon, the activated carbon layer can be locally overtaxed on a short-term basis, which then also results in breakthroughs.

Finally, it is well known that activated carbon fiber woven, knitted, or nonwoven fabrics can be used as the adsorbent in air-permeable protective suits of the aforementioned type, which are bonded on one side with a textile support layer by means of a hot-melt adhesive applied over a large area and are provided with a textile cover material or "outer material" on the side facing away from the support layer (see, e.g., German patent document DE 195 19 869 C2). However, although activated carbon fibers have a relatively high initial adsorption rate or adsorption kinetics, their total adsorption or loading capacity is often inadequate, especially compared to activated carbon particles in granular or spherical form, so that in the worst case (i.e., exposure to large amounts of harmful/toxic substances), the adsorption or loading capacity of the whole protective suit may be exhausted. Moreover, under extreme conditions (e.g., if a drop of a concentrated toxic agent falls from a considerable height onto an open place in the outer material), the activated carbon fiber woven, knitted, or nonwoven fabric can be locally overtaxed on a short-term basis, so that breakthroughs may also occur. Finally, activated carbon fiber woven, knitted, or nonwoven fabrics are not always sufficiently wear-resistant under stress (e.g., during the wearing of the protective suit). Accordingly, the fibers may break and channels may form in the adsorption layer, through which the toxic substances that are to be adsorbed may then pass without hindrance.

SUMMARY OF THE INVENTION

It is an objective of the present invention to provide an adsorption filter material or flat-shaped filter material, which at least partially avoids the disadvantages of the prior art.

It is another objective of the present invention to provide an adsorption filter material or flat-shaped filter material which is suitable for the production of protective materials, especially NBC protective materials, such as protective suits, protective gloves, and protective covers and is also suitable for other applications.

A further objective of the present invention is to provide an adsorption filter material or flat-shaped filter material for use in protective materials, such as NBC protective materials (e.g., protective suits, protective gloves, protective covers), but also for other filtering purposes (e.g., in the field of air filters or in the medical field), which has a large adsorption or loading capacity and at the same time exhibits good breakthrough behavior, especially initial breakthrough behavior.

Yet another objective of the present invention is to provide an adsorption filter material or flat-shaped filter material for use in protective materials, such as NBC protective materials (e.g., protective suits, protective gloves, and protective covers), which at the same time ensures a high degree of wearing comfort.

The problem on which the present invention is based is solved by an adsorption filter material or flat-shaped filter material having a first layer, a second layer, and an adsorption layer arranged between the first and second layers. The adsorption layer includes a first activated carbon layer with granular or spherical activated carbon particles. The adsorption layer further includes activated carbon fibers arranged in at least one of the first activated carbon layer and a second activated carbon layer.

Surprisingly, it was found that an adsorption filter material (flat-shaped filter material) that combines the advantageous properties of granular or spherical activated carbon particles with the advantageous properties of activated carbon fibers in a single material, improves or optimizes the breakthrough behavior of the filter material, especially at the beginning of the adsorption process, and at the same time results in a good total adsorption capacity. The weight-specific total load of activated carbon in the filter material likewise can be significantly reduced in this way compared to conventional filter materials with activated carbon alone, because the necessary initial "adsorption spontaneity" and thus the good initial breakthrough behavior of the filter material is ensured by the fibrous activated carbon.

The adsorption filter material or flat-shaped filter material described above may be used for the production of protective materials, such as NBC protective suits.

Although the activated carbon fibers may be present together with the activated carbon granules or spherules within a single activated carbon layer, the adsorption layer/ply of the present invention preferably includes a second activated carbon layer/ply with activated carbon fibers. In the preferred embodiment, the activated carbon granules or spherules, on the one hand, and the activated carbon fibers, on the other hand, are present in separate adsorption layers/plies which border on each other or are joined to each other.

In the preceding statements as well as in the discussion which follows, the terms "ply" and "layer" are used synonymously and, in accordance with the present invention, denote not only continuous, uninterrupted plies or layers, but also discontinuous, interrupted plies or layers.

The granular or spherical activated carbon particles used in the adsorption filter material may be produced by carbonization and subsequent activation of suitable organic starting materials in granular or spherical form. An example of a suitable polymer is polystyrene crosslinked with divinylbenzene. This material may be present, for example, in the form of ion exchangers (e.g., cation exchangers) or precursors of such ion exchangers. The starting materials may also consist, for example, of porous, especially macroporous, or even gel-like polymer pellets or granules or pitch pellets or granules. The expert is familiar with the production of granular or spherical activated carbon. The reader may refer, for example, to U.S. Pat. No. 4,510,193, U.S. patent application Publication No. U.S. 2003/092560, and H. v. Kienle and E. Bäder, *Aktivkohle und ihre industrielle Anwendung (Activated Carbon and Its Industrial Use)*, Ferdinand Enke Verlag, Stuttgart 1980, the disclosed contents of which are incorporated herein by reference. Instead of the activated carbons specified above, so-called "splint carbon" or "chip carbon" may be used in the adsorption filter material of the invention, for example, one that can be produced by carbonization and subsequent activation of coconut shells. The term "granular activated carbon" or "granular activated carbon particles" as used in the context of the present invention, also includes forms of activated carbon of this type.

Particles of granular or spherical activated carbon that are suitable in accordance with the present invention have mean particle diameters of 0.05 to 1 mm, preferably 0.1–0.8 mm, and more preferably 0.1–0.6 mm. Particles of granular or spherical activated carbon that are suitable in accordance with the invention generally have a specific surface (BET) of at least 800 $m^2/g$, preferably at least 900 $m^2/g$, and most preferably 800 to 1,500 $m^2/g$.

The activated carbon fibers used in accordance with the invention are produced by carbonization and subsequent activation of suitable organic starting fibers, especially cellulose fibers, fibers based on cellulose derivatives, phenol resin fibers, polyvinyl alcohol fibers, pitch fibers, acrylic resin fibers, polyacrylonitrile fibers, aromatic polyamide fibers, formaldehyde resin fibers, divinylbenzene-crosslinked polystyrene fibers, lignin fibers, cotton fibers, and hemp fibers. The use of carbonized and activated fibers based on cellulose and cellulose derivatives is preferred.

Those skilled in the art are familiar with the production of activated carbon fibers of these types. In this regard, the reader may refer, for example, to German patent document DE 195 19 869 A1, U.S. Pat. No. 3,849,332, German patent document DE 33 39 756 C2, U.S. patent application Publication No. 2003/032556, and U.S. Pat. No. 6,120,841, the entire disclosed contents of which are incorporated herein by reference.

Fibers that are preferred in accordance with the present invention are obtained by the process specified in U.S. Pat. No. 6,120,841. In accordance with this process, a fiber structure from a carbon precursor material based on cellulose (e.g., rayon, floss silk, solvated celluloses, cotton, stem fibers) is impregnated with a composition that includes at least one mineral component (e.g., phosphoric acid, sulfuric acid, hydrochloric acid, etc.) that has a promotor effect for the dehydration of cellulose. The fiber structure that has been impregnated in this way is then subjected to a heat treatment at a temperature that is sufficient to cause the conversion of the cellulose precursor essentially to carbon. The heat treatment is carried out in an inert or partially oxidizing atmosphere and includes a stage in which the temperature is ramped at a mean rate of 1–15° C./min and then a stage in which the temperature is maintained at 350–500° C., and followed by a step in which residual phases of the impregnation composition and decomposition products of the cellulose material are removed by washing.

The activated carbon fiber material used in accordance with the present invention, especially the second activated carbon layer, preferably has the form of an activated carbon fiber textile material, for example, woven fabrics, machine-knitted fabrics, hand-knitted fabrics, layered fabrics, matted fabrics, fleeces, felts, or other bonded fabrics. Preferred materials are nonwoven materials, such as fleeces, felts, layered fabrics (e.g., multidirectional layered fabrics), as well as woven fabrics. A preferred nonwoven material in accordance with the present invention is formed, for example, such that the activated carbon fibers (carbon fibers), together with thermoplastic, sticky bicomponent fibers, form an activated carbon fiber structure, in which the content of thermoplastic bicomponent fibers should not exceed 50 wt. %, based on the activated carbon fiber structure.

Activated carbon fiber textile materials that may be used in accordance with the present invention generally have a weight of 10–200 g/m², preferably 10–150 g/m², more preferably 10–120 g/m², still more preferably 20–100 g/m², and most preferably 25–80 g/m².

The activated carbon fibers used in accordance with the present invention have mean fiber diameters particularly in the range of 1–25 µm, preferably 2.5–20 µm, and more preferably 5–15 µm. Their length-specific weight (titer) is generally in the range of 1–10 dtex, and especially 1–5 dtex.

To obtain an optimum relationship between the adsorption capacity of the adsorption material of the present invention and its breakthrough behavior, the ratio of the mean particle diameter of the granular or spherical activated carbon particles to the mean fiber diameter of the activated carbon fibers should be selected in a certain range. Especially good results are obtained, if the mean particle diameter of the granular or spherical activated carbon particles ($\overline{d}_{activatedcarbonparticle}$) is greater than the mean fiber diameter of the activated carbon fibers ($\overline{d}_{activatedcarbonfiber}$) by a factor of at least three, preferably by a factor of at least four, more preferably by a factor of at least five, and most preferably by a factor of at lest six. Thus, in accordance with a preferred embodiment: $\overline{d}_{activatedcarbonparticle}/\overline{d}_{activatedcarbonfiber} > 3$, preferably >4, more preferably >5, and most preferably >6.

The total amount of activated carbon (i.e., activated carbon granules/spherules plus activated carbon fibers) of the adsorption filter material may vary within a wide range. In general, it is 25–300 g/m², preferably 30–250 g/m², more preferably 50–250 g/m², and most preferably 60–220 g/m².

In general, the first activated carbon layer with the granular or spherical activated carbon particles and the second activated carbon layer with the activated carbon fibers border directly on each other or are arranged one directly above the other. In accordance with the invention, it is preferred for the first activated carbon layer and the second activated carbon layer to be permanently joined together, preferably seamlessly, and more preferably by adhesive bonding to form a composite.

Depending on the application, the granular or spherical activated carbon and/or the activated carbon fibers may be impregnated with at least one catalyst. The catalyst may be selected, for example, from among metals and metal compounds (e.g., transition metals, especially noble metals). The catalyst is preferably selected from the group comprising copper, cadmium, silver, platinum, palladium, zinc, and mercury, and their compounds. The amount of catalyst, based on the impregnated activated carbon material, may vary within a wide range. In general, it is in the range of 0.01 to 15 wt. %, preferably 0.05 to 12 wt. %, and more preferably 5–12 wt. %. The impregnation of activated carbon with catalysts is well known from the state of the art. For further details, the reader may refer to the previously cited work, H. v. Kienle and E. Bäder, *Aktivkohle und ihre industrielle Anwendung* (*Activated Carbon and Its Industrial*), Ferdinand Enke Verlag, Stuttgart 1980, and to German patent document DE 195 19 869 A1.

The two outer layers of the adsorption material of the present invention are preferably textile materials, more preferably air-permeable textile materials, and most preferably textile cloths, such as woven fabrics, machine-knitted fabrics, hand-knitted fabrics, layered fabrics, matted fabrics, fleeces, felts, or other bonded fabrics. The textile material generally has a weight of 50–300 g/m², preferably 75–250 g/m², and more preferably 90–175 g/m². In accordance with a special embodiment, one of the two outer layers or even both outer layers may be rendered oleophobic. This has the advantage that the usually organic toxic substances are repelled by the surface of the outer layer(s) and are unable to penetrate the fabric.

The two outer layers generally serve as support layers for the adsorption layer. The adsorption filter material of the invention thus has a sandwich construction.

In particular, the first layer and the second activated carbon layer may serve as support layers for the first activated carbon layer, and the second layer and the first activated carbon layer may serve as support layers for the second activated carbon layer.

In this way, an adsorption filter material is produced, which is formed as a multilayer, especially air-permeable, composite material that comprises several layers that are joined together, such that the individual layers of the adsorption filter material of the invention are joined, preferably seamlessly, and more preferably by adhesive bonding. To produce permanent and seamless bonding of each set of two layers, adhesive is generally applied in amounts of 5–100 g/m², preferably 5–75 g/m², and more preferably 10–50 g/m². In this regard, well-known state-of-the-art adhesives and application techniques may be used. For example, the adhesive bonding may be performed by whole-surface application of the adhesive or by spot application (e.g., in a grid pattern). Hot-melt adhesive webs are also suitable. In addition, reactive hot-melt adhesives (e.g., based on polyurethane) may be used as adhesives. The granular or spherical activated carbon particles may, for example, be bonded by first applying spots of adhesive in a grid pattern on the given support layer, i.e., the first outer layer or the second activated carbon layer, and then fixing the activated carbon granules or spherules on the spots of adhesive. The expert is already familiar with the adhesive bonding itself.

The resulting total weight of the adsorption filter material itself is 75–1,000 g/m², preferably 100–800 g/m², and more preferably 125–500 g/m². The adsorption filter material of the present invention is preferably gas-permeable and air-permeable. In this regard, the gas-permeability and air-permeability of the adsorption filter material of the invention is preferably more than 50 $L \cdot m^{-2} \cdot s^{-1}$, more preferably more than 100 $L \cdot m^{-2} \cdot s^{-1}$, and most preferably more than 200 $L \cdot m^{-2} \cdot s^{-1}$, and may be as high as 10,000 $L \cdot m^{-2} \cdot s^{-1}$. The adsorption filter material of the invention preferably has a water vapor permeability of at least 5 L/m² per 24 h, more preferably at least 10 L/m² per 24 h, and most preferably at least 12 L/m² per 24 h.

In general, the adsorption filter material of the invention is designed to be washable and can thus be decontaminated and regenerated. For these purposes, the adsorption filter material of the invention is generally thermally stable, preferably up to temperatures of 100° C. or more, and more preferably up to temperatures of 150° C.

In addition, a barrier layer, which is generally permeable to water vapor and at least essentially impermeable to gas and air, may be provided between the first layer and the adsorption layer and/or between the second layer and the adsorption layer. An adsorption filter material in accordance with the invention is then obtained that is impermeable to gas and air but permeable to water vapor. This specific embodiment of the invention is described in greater detail below.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
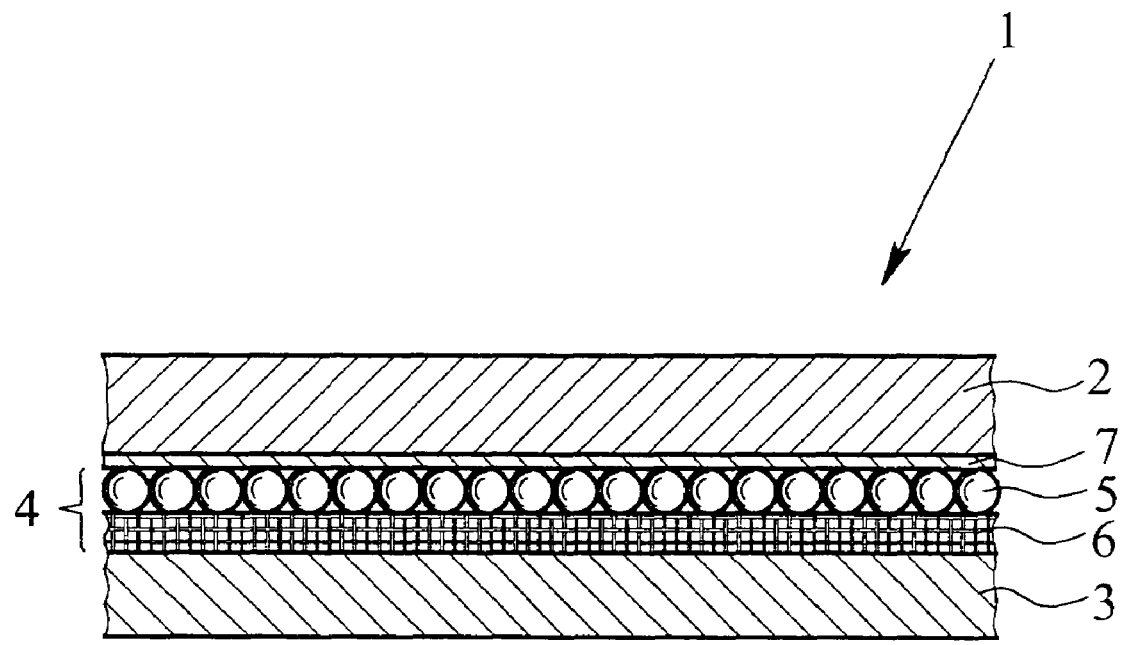
FIG. 1 is a cross-sectional view of the adsorption filter material according to an embodiment of the invention.

FIG. 1, shows an adsorption filter material 1 in accordance with the present invention including a first layer 2 and a second layer 3. Each of the first and second layers 2, 3 is made of a textile material and is preferably permeable to air. The filter material 1 further includes an adsorption layer 4 arranged between the first layer 2 and the second layer 3. The adsorption layer 4 comprises a first activated carbon layer 5 with granular or spherical activated carbon particles and a second activated carbon layer 6 with activated carbon fibers, which borders directly on or is bonded to the first activated carbon layer 5. The activated carbon fibers are present preferably in the form of an activated carbon fiber cloth, which preferably consists of a nonwoven material.

A barrier layer 7, which may optionally be provided between the adsorption layer 4 or the first activated carbon layer 5 and the first layer 2, is designed to be generally permeable to water vapor and at least essentially impermeable to gas and air. This barrier layer 7 is at least essentially impermeable to toxic chemical agents that are to be adsorbed, especially chemical warfare agents, such as vesicants, or at least is capable of retarding their passage. Furthermore, the barrier layer 7 should be at least essentially impermeable to liquids, especially water, and to aerosols (e.g., chemical and/or biological warfare agents), or at least must retard their passage. The barrier layer 7 may be applied as a continuous, closed layer on the first layer 2 and at the same time may serve as a bonding material for the adsorption layer 4 or the first activated carbon layer 5. Examples of suitable barrier layer materials are suitable polymers or plastics, e.g., polyurethane and polyurethane derivatives, cellulose and cellulose derivatives, polyesters, polyamides, and modified polyesters and polyamides. If a barrier layer 7 is used, it generally has a thickness of 1–1,000 µm, preferably 1–500 µm, more preferably 5–250 µm, still more preferably 5–150 µm, most preferably 10–100 µm, and especially 10–50 µm. If a barrier layer 7 is present, it generally should have a water vapor permeability of at least 20 L/m² per 24 h at 25° C. and a thickness of the barrier layer of 50 µm.

The adsorption filter material 1 shown in FIG. 1 is designed as a composite material that consists of several successive bonded layers, which are permanently and seamlessly joined together, preferably by adhesive bonding. The adhesive bonding of the individual layers may be accomplished with a suitable adhesive, preferably a hot-melt adhesive, and especially a reactive hot-melt adhesive (e.g., based on polyurethane), with hot-melt adhesive webs, with foam bonding based on polyurethane foam, or by any other known methods. Those skilled in the art are already familiar with the production of composite filter materials and must only draw from his general technical knowledge.

The adsorption filter material of the present invention is suitable for the production of protective materials of all types, preferably protective suits (for both civilian and military use), protective gloves and protective covers, and more preferably all of the specified protective materials for NBC use. Furthermore, the adsorption filter material of the invention is also suitable for the production of filters and filter materials of all types, especially for the removal of noxious substances, foul-smelling substances, and toxic substances from air and/or gas flows, such as gas mask filters, deodorant filters, surface filters, air filters, especially filters for room air purification, adsorptive support structures, and filters or filter materials for medical applications.

In accordance with the invention, the adsorption filter material of the present invention is preferably used such that, as viewed from the direction of flow, the incoming air stream, after passing through the first layer ("outer layer"), first encounters the adsorption layer with granular or spherical activated carbon particles and then encounters the activated carbon layer with activated carbon fibers.

The protective materials produced with the adsorption filter material of the invention are themselves a further object of the present invention.

Finally, an additional object of the present invention is a method for improving the breakthrough behavior of an adsorption filter material of the type previously described through the use of activated carbon both in the form of granules or spheroids, on the one hand, and in the form of fibers, on the other hand.

The present invention makes available an efficient adsorption filter material that combines the properties of high adsorption capacity, on the one hand, and good breakthrough behavior, on the other hand, in a single material. At the same time, the adsorption filter material of the invention allows a significant reduction of the total amount of activated carbon contained in the material, since the breakthrough behavior or the initial adsorption spontaneity is guaranteed by the activated carbon fibers. As a result, the weight per unit area of the adsorption filter material can be significantly reduced compared to state-of-the-art materials.

Due to the improvement of the spontaneity behavior, the especially important initial breakthrough of harmful and toxic substances is significantly reduced in the adsorption filter material of the invention.

Depending on application requirements, an adsorption filter material is made available, which has high water vapor permeability and can be designed to be either air-permeable (without a barrier layer) or air-impermeable (with a barrier layer). In addition, the washability of the adsorption filter material of the invention allows good decontamination and regeneration.

Further advantages and further refinements, modifications, and variations of the present invention can be immediately recognized and realized by an individual skilled in the art upon reading the specification without exceeding the scope of the present invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An adsorption filter material for producing protective materials, comprising:
    first and second layers;
    an adsorption layer arranged between said first and second layers, wherein the adsorption layer includes a first activated carbon layer having activated carbon particles comprising at least one of granules and spherules of activated carbon, said adsorption layer further comprising activated carbon fibers; and
    at least one barrier layer between said adsorption layer and at least one of said first and second layers, wherein said barrier layer is designed to be permeable to water vapor and essentially impermeable to gas and air.

2. The adsorption filter material of claim 1, wherein said adsorption layer further comprises a second activated carbon layer, said activated carbon fibers being arranged in said second activated carbon layer.

3. The adsorption filter material of claim 1, wherein said activated carbon fibers are arranged in said first activated carbon layer.

4. The adsorption filter material of claim 1, wherein said activated carbon particles are produced by carbonization and subsequent activation of suitable granular or spherical organic starting materials.

5. The adsorption filter material of claim 1, wherein said activated carbon particles of said first activated carbon layer have a mean particle diameter of 0.05 to 1 mm.

6. The adsorption filter material of claim 1, wherein said activated carbon particles have a specific surface (BET) of at least 800 $m^2/g$, and up to 1,500 $m^2/g$.

7. The adsorption filter material of claim 1, wherein said activated carbon fibers are produced by carbonization and subsequent activation of suitable organic starting fibers.

8. The adsorption filter material of claim 7, wherein said organic starting fibers are selected from the group comprising cellulose fibers, fibers based on cellulose derivatives, phenol resin fibers, polyvinyl alcohol fibers, pitch fibers, acrylic resin fibers, polyacrylonitrile fibers, aromatic polyamide fibers, formaldehyde resin fibers, divinylbenzene-crosslinked polystyrene fibers, lignin fibers, cotton fibers, and hemp fibers.

9. The adsorption filter material of claim 1, wherein said activated carbon fibers comprise an activated carbon fiber textile material.

10. The adsorption filter material of claim 1, wherein said activated carbon fibers have a mean fiber diameter of 1–25 μm.

11. The adsorption filter material of claim 1, wherein said activated carbon fibers have a length-specific weight (titer) of 1–10 dtex.

12. The adsorption filter material of claim 1, wherein the mean particle diameter of said activated carbon particles is at least three times greater than the mean fiber diameter of the activated carbon fibers.

13. The adsorption filter material of claim 1, wherein a total amount of activated carbon in said activated carbon particles and said activated carbon fibers in said adsorption filter material is 25–300 $g/m^2$.

14. The adsorption filter material of claim 2, wherein said first activated carbon layer and said second activated carbon layer are arranged relative to each other such that they border directly on each other or are arranged one directly above the other.

15. The adsorption filter material of claim 1, wherein at least one of said activated carbon particles and said activated carbon fibers are impregnated with a catalyst.

16. The adsorption filter material of claim 15, wherein said catalyst is selected from among metals and metal compounds, said metals being selected from the group comprising copper, cadmium, silver, platinum, palladium, zinc, and mercury, and their compounds.

17. The adsorption filter material of claim 15, wherein said catalyst is impregnated by an amount equal to 0.01 to 15 wt. % of said at least one of said activated carbon particles and said activated carbon fibers.

18. The adsorption filter material of claim 1, wherein at least one of said first layer and said second layer is an air-permeable textile material.

19. The adsorption filter material of claim 1, wherein at least one of said first layer and said second layer is rendered oleophobic.

20. The adsorption filter material of claim 1, wherein at least one of said first layer and said second layer is a support layer for said adsorption layer.

21. The adsorption filter material of claim 2, wherein one of said first layer and said second activated carbon layer comprises a support layer for said first activated carbon layer, and wherein one of said second layer and said first activated carbon layer comprises a support layer for said second activated carbon layer.

22. The adsorption filter material of claim 1, wherein said adsorption filter material is formed as an air-permeable multilayer composite material that comprises several layers joined together.

23. The adsorption filter material of claim 1, wherein said adsorption filter material has a total weight of 75–1,000 $g/m^2$.

24. The adsorption filter material of claim 1, wherein said adsorption filter material is gas-permeable and air-permeable, and the gas-permeability and air-permeability of said adsorption filter material is greater than 50 $L \cdot m^{-2} \cdot s^{-1}$, and as high as 10,000 $L \cdot m^{-2} \cdot s^{-1}$.

25. The adsorption filter material of claim 1, wherein said adsorption filter material has a water vapor permeability of at least 5 $L/m^2$ per 24 h.

26. The adsorption filter material of claim 1, wherein said barrier layer is at least essentially impermeable to or at least retards passage of toxic chemical agents and chemical warfare agents.

27. The adsorption filter material of claim 1, wherein said barrier layer is at least essentially impermeable to or at least retards the passage of liquids and aerosols.

28. The adsorption filter material of claim 1, wherein said barrier layer is applied as a continuous closed layer on one of said first and second layers.

29. The adsorption filter material of claim 1, wherein a thickness of said barrier layer is 5–500 μm.

30. The adsorption filter material of claim 1, wherein said barrier layer comprises at least one of a plastic and an organic polymer.

31. An adsorption filter material for producing protective materials, comprising:
    first and second layers;

an adsorption layer arranged between said first and second layers, wherein the adsorption layer includes a first activated carbon layer having activated carbon particles comprising at least one of granules and spherules of activated carbon, said adsorption layer further comprising activated carbon fibers; and at least one barrier layer between said adsorption layer and at least one of said first and second layers, wherein said barrier layer comprises one of a multilayer laminate and a multilayer composite comprising several layers of plastic or polymer.

32. An adsorption filter material for producing protective materials comprising:

first and second layers;

an adsorption layer arranged between said first and second layers, wherein the adsorption layer includes a first activated carbon layer having activated carbon particles comprising at least one of granules and spherules of activated carbon, said adsorption layer further comprising activated carbon fibers; and at least one barrier layer between said adsorption layer and at least one of said first and second layers, wherein said adsorption filter material has a water vapor permeability of at least 10 L/m$^2$ per 24 h with said barrier layer at a thickness of 50 μm.

33. An adsorption filter material for producing protective materials comprising:

first and second layers; and an adsorption layer arranged between said first and second layers, wherein the adsorption layer includes a first activated carbon layer having activated carbon particles comprising at least one of granules and spherules of activated carbon, and a second activated carbon layer comprising activated carbon fibers arranged in said second activated carbon layer; and wherein said adsorption filter material is a composite material with several successive layers bonded to one another, wherein said adsorption filter material contains the following layers in sequence:

said first layer, wherein said first layer comprises a textile that has been rendered oleophobic;

a water vapor-permeable and at least essentially gas-impermeable and air-impermeable barrier layer;

said adsorption layer, wherein said adsorption layer comprises said first activated carbon layer with said activated carbon particles and said second activated carbon layer with activated carbon fibers; and said second layer, wherein said second layer comprises a textile layer.

34. The adsorption filter material of claim 1, wherein said adsorption filter material is thermally stable.

35. Use of the adsorption filter material of claim 1 for producing protective materials.

36. The use of the adsorption filter material of claim 35, wherein said protective materials are selected from the group consisting of protective suits for civilian or military use, protective gloves and protective covers.

37. Use of the adsorption filter material of claim 1 for producing filters and filter materials for the removal of noxious substances, foul-smelling substances, and toxic substances of all types from air and gas flows, the filters and filter materials being selected from the group consisting of gas mask filters, deodorant filters, surface filters, air filters, filters for room air purification, adsorptive support structures, and filters or filter materials for medical applications.

38. A protective material including one of a protective suit, a protective glove, and a protective cover, produced using said adsorption filter material of claim 1 and including said adsorption filter material.

* * * * *